United States Patent [19]
Wu et al.

[11] Patent Number: 6,014,545
[45] Date of Patent: Jan. 11, 2000

[54] GROWABLE ARCHITECTURE FOR HIGH-SPEED TWO-WAY DATA SERVICES OVER CATV NETWORKS

[75] Inventors: Chiung-Shien Wu, Taipei; Gin-Kou Ma, Hsinchu, both of Taiwan

[73] Assignee: Industrial Technology Research Institute, Hsinchu, Taiwan

[21] Appl. No.: 08/827,175

[22] Filed: Mar. 27, 1997

[51] Int. Cl.[7] .................................................. H04N 7/10
[52] U.S. Cl. .................................. 455/3.1; 348/6; 348/12; 370/485
[58] Field of Search .................... 455/3.1, 3.3; 348/6, 348/12, 13; 395/200.47; 370/485–490

[56] References Cited

U.S. PATENT DOCUMENTS

| | | | |
|---|---|---|---|
| 4,928,272 | 5/1990 | Ohue | 370/50 |
| 5,124,980 | 6/1992 | Maki | 370/77 |
| 5,126,840 | 6/1992 | Dufresne et al. | 348/6 |
| 5,434,611 | 7/1995 | Tamura | 348/8 |
| 5,481,757 | 1/1996 | Mihara et al. | 455/3.1 |
| 5,499,047 | 3/1996 | Terry et al. | 455/3.1 |
| 5,528,582 | 6/1996 | Bodeep et al. | 370/486 |
| 5,553,064 | 9/1996 | Paff et al. | 370/50 |
| 5,557,319 | 9/1996 | Gurusami et al. | 348/11 |
| 5,581,555 | 12/1996 | Dubberly et al. | 370/487 |
| 5,729,824 | 3/1998 | O'Neill et al. | 348/6 |

OTHER PUBLICATIONS

"Adaptive Digital Access Protocol: A MAC Protocol for Multiserve Broadband Access Networks", James E. Dail, Miguel A. Dajer, Chia–Chang Li, Peter D. Magill, Curtis A. Siller, Jr., Kotikalapudi Sriram and Norman A. Whitaker; IEEE Communications Magazine, Mar. 1996.

"MLAP: A MAC Level Access Protocol for the HFC 802.14 Network" Chatschik Bisdikian, Bill McNeil, Rob Norman and Ray Zeisz; IEEE Communications Magazine, Mar. 1996.

"A Distributed Queuing Random Access Protocol for a Broadcast Channel" Wenxin Xu, Reuters Information Technology; Graham Campbell; ACM SIG Comm., 1993.

"A Generalized Processor Sharing Approach to Flow Control in Integrated Services Networks: The Single–Node Case" Abhay K. Parekh, Robert G. Gallager; IEEE/ACM Transaction on Networking, vol. 1., No. 3, Jun. 1993.

"A Protocol for Efficient Transfer of Data over Fiber/Cable Systems" Dolors Sala, John O. Limb; IEEE Infocom, 1996.

"Extended DQRAP (XDQRAP) A Cable TV Protocol Functioning as a Distributed Switch" Chien–Ting Wu, Graham Campbell; IEEE 1st Workshop on Community Networking, 1994.

*Primary Examiner*—Victor R. Kostak
*Attorney, Agent, or Firm*—Proskauer Rose LLP

[57] ABSTRACT

A cable network is provided with at least one bridge that is connected to a first cable segment of the cable network. The bridge receives from a shared communication medium a first carrier signal, having a first carrier frequency that is allocated for intra cable segment packet communication, containing packets modulated thereon. The bridge demodulates selected packets originating in the first cable segment from the first carrier signal. The bridge modulates each of the demodulated packets, that are destined outside of the first cable segment, onto a second carrier signal having a second carrier frequency. The bridge then transmits the second carrier signal on an upstream link of the common shared medium.

18 Claims, 8 Drawing Sheets

GROWABLE ARCHITECTURE FOR HIGH-SPEED TWO-WAY DATA SERVICES OVER CATV NETWORKS

FIELD OF THE INVENTION

The present invention relates to cable television networks, and in particular, to enabling data communication amongst multiple terminal equipments, such as set top boxes, a cable modem and a head end.

BACKGROUND OF THE INVENTION

Many researchers have investigated the possibility of providing wide-band communication to each home or household. Such wide-band communications include: high speed transactional data and internet access, "media on demand" or selective real-time continuous, streamed communication, such as audio, video or both (e.g., video on demand), real-time, two-way streamed communication, i.e., voice, audio and/or video (e.g., telephone, video phone, etc.) or some combination of these communications. Currently in the United States, Japan, Europe and other developed countries of the world, most homes are connected by a traditional telephone line to a telephone network. Many of these homes also have a Community Antenna Television (CATV) or "cable TV" connection. Most telephone lines installed at customer premises only support "plain old telephone service." These telephone lines are designed to have a limited bandwidth of about 3 kHz. On the other hand, most cable network links to subscriber locations are coaxial lines. The limitation on bandwidth to such subscriber locations is mostly dictated by the bandwidth of the coaxial and optical trunk lines that connect the subscriber locations to the cable head end or source transmitter of information. The bandwidth of existing trunk lines ranges from 350 MHZ to 1 GHz and is usually approximated as 750 MHZ for an average cable network. Consider that a video signal alone compressed to an average acceptable fidelity, according to the MPEG standard, requires at least a 1.5 Mbit/sec bit rate. The widely deployed plain old telephone service lines can currently support only about a 33.4 Kbit/sec bit rate. As such, the currently deployed cable network infrastructure is more capable of supporting high bandwidth communication to the subscriber locations than the currently deployed telephone network.

FIG. 1 shows a cable network 10. Signals received at satellite receiver 12 or via trunk line 14 are fed to head end 16. The head end 16 may process the signals. Most importantly, the head end 16 selects amongst the received video program signals, modulates each of the signals onto a different carrier signal having a different carrier frequency, and transmits the carrier signals onto the shared medium 18. The shared medium 18 is composed of individual links 20, which may be optical fibers or coaxial cables. An output trunk line link 20 from the head end 16 is connected to an amplifier/splitter A1. Three links 20 (preferably trunk line links) are outputted from the amplifier A1, to the amplifiers A2, A3 and A4, respectively. Each of these links are downstream links relative to the amplifier A1 whereas the link to the cable head end 16 is an upstream link. Additional links 20 are provided for connecting the amplifiers A5, A6, A7, A8 and A9. Links 20 of the shared medium 18 (preferably thinner gauge coaxial cable as may be used in trunk line links) are also provided for connecting terminal equipments, such as set top boxes or cable modems, TE1, TE8 and TE15 to the amplifier A2, for connecting terminal equipments TE2, TE6 and TE7 to the amplifier A4, for connecting terminal equipments TE9, TE16 and TE17 to the amplifier A5, for connecting terminal equipments TE3, TE4 and TE5 to the amplifier A6, for connecting terminal equipments TE12, TE13 and TE14 to the amplifier A7, for connecting terminal equipments TE10 and TE11 to the amplifier A8 and for connecting terminal equipments TE18, TE19 and TE20 to the amplifier A9. The overall topology of the cable network 10 is a tree configuration with the head end 16 at the root of the tree and the terminal equipments TE1–TE20 at leaves of the tree.

Cable networks are currently used primarily to deliver communicated information in a single direction, namely, from the head end to the terminal equipments at the subscriber locations. Typically, the information is traditional broadcast video programming, wherein each video program or "television channel" is modulated onto a separate carrier frequency in the band from 50–750 MHZ with a 6 MHZ bandwidth. The band from 0 to 50 MHZ (actually, the sub-band of 5–40 MHZ) is often used as a back channel for communicating short control messages from the terminal equipments to the head end, such as requests to receive pay per view events. The head end can also transmit authorization control messages to the terminal equipments in this band for enabling them to descramble or decrypt a pay per view event.

In the course of several standards bodies proceedings (e.g., Digital Audio Visual Council, or DAVIC, IEEE 802.14, etc.), a number of architectures have been proposed for providing subscriber location wide-band communication using a cable network. According to the DAVIC proposal, the 50–450 MHZ band is allocated for analog broadcast video programming, the 450–750 MHZ (or higher) band is allocated for digital broadcast video programming and the 5–45 MHZ band is allocated for wide-band terminal equipment communication. Either Quadrature Phase Shift Keying (QPSK) or Quadrature Amplitude Modulation (QAM) may be used for modulating wide-band terminal equipment communicated information onto 6 MHZ bandwidth carrier frequencies. See DIGITAL AUDIO VISUAL COUNCIL, DAVIC 1.0 SPECIFICATION, PART 8: LOWER LAYER PROTOCOLS AND PHYSICAL INTERFACES, rev. 3.1 (1995). The proposed multiple communication multiplexing techniques can be categorized as time division multiplexing (TDM) or frequency division multiplexing (FDM). Furthermore, the proposed techniques for allocating communication channels and resolving contention (when more communications than available channels contend to use the channels) can be categorized as polling or random access techniques. Each of these techniques is briefly described below.

FDM

The techniques described in U.S. Pat. Nos. 4,928,272 and 5,124,980 may be categorized as FDM. Consider the cable network 10. As noted, a portion of bandwidth that can be carried by the shared medium 18 is not used (or under utilized) for traditional broadcast programming and therefore is available for wide-band terminal equipment communication. The unutilized bandwidth is divided into multiple sub-bands. Each sub-band defines a separate communication channel. Each communication channel is assigned a different carrier frequency depending on its respective sub-band. Such an allocation is depicted in FIG. 2. Communication on a respective channel is achieved by modulating a bitstream containing the to-be-communicated data or message onto a carrier signal having the same carrier frequency as the channel on which the communication is to take place. The modulated carrier signal is then transmitted on the channel.

The available channels are organized into data channels and one or more control channels. When a terminal equipment, e.g., TE5, desires to communicate, the terminal equipment TE5 transmits a request message to the head end 16, via the one of the control channels (using the above described modulation technique). The head end 16 responds to the requesting terminal equipment TE5 by allocating an available channel to TE5 (assuming a channel is available) and transmitting a message back to TE5 on one of the control channels indicating the channel which was allocated to TE5. The terminal equipment TE5 can then freely communicate on the allocated channel without contention.

Note that the control channels are shared by the head end 16 and all of the terminal equipments TE1–TE20. Thus, contention may arise in attempting to communicate on these channels.

The disadvantage of this solution is that the head end 16 may service thousands of terminal equipments connected to shared medium 18. While not all terminal equipments may be simultaneously communicating, the allocation of bandwidth amongst the communicating terminal equipments is fixed by the limited bandwidth allocated for wide-band communication. Second, a contention resolution scheme is needed for the control channel. As noted below, the conventional contention resolution techniques require a large amount of bandwidth. Note also that the currently deployed cable network 10 is designed to carry signals on 6 MHZ sub-bands and is less well adapted to carrying narrower sub-band signals. Such large sub-bands would provide too few channels for allocation amongst the large number of terminal equipments.

TDM

The techniques described in J. Dail, M. Dajer, C. C. Li, P. Magill, C. Siller, Jr., K. Sriram & N. Whitaker, *Adaptive, Digital Access, Protocol: A MAC Protocol for Multiservice Broadband Access Networks*, IEEE COMM., vol. 34, no. 3, March 1996, pp. 104–112, C. Bisdikian, B. McNeil, R. Norman & R. Zeisz, *MLAP: A MAC Level Access Protocol for the HFC 802.14 Network*, IEEE COMM., vol. 34, no. 3, March 1996, pp. 114–121, and W. Xu & C. Graham, *A Distributed Queuing Random Access Protocol for a Broadcast Channel*, ACM SIGCOMM. '93, pp. 270–278 may be categorized as TDM. According to this technique, the unused bandwidth of the shared medium 18 is divided into two sub-bands and each sub-band is used as a separate communication channel, namely, an upstream (to the head end 16) directed channel and a downstream (away from the head end 16) directed channel as shown in FIG. 3. Each of the upstream and downstream channels is assigned a respective carrier frequency. A bitstream is modulated onto the respective carrier frequency and transmitted in the upstream or downstream channel. Each of the bitstreams is divided into slots and "mini-slots." Each slot or mini-slot is a time period into which a packet or mini packet may be written or from which a packet may be read. FIG. 4 shows an illustrative packet 20 which includes a header portion 22 and a payload portion 24. The header 22 contains unique addresses or identifiers of the source, from which the packet originated, and the destination, at which the packet terminates. Messages to be conveyed from the source to the destination are written in the payload 24.

As noted above, packets are transmitted by modulating each packet onto a carrier signal having the appropriate upstream channel or downstream channel carrier frequency. Each carrier signal thus formed is then transmitted during an appropriate slot or mini-slot period of the upstream or downstream channel. Packets are received from the upstream channel by receiving the carrier signals with the same carrier frequency assigned to the upstream channel and demodulating the packets from such signals. Likewise, packets are received from the downstream channel by receiving the carrier signals with the same carrier frequency assigned to the downstream channel and demodulating the packets from such signals.

When a terminal equipment, e.g., terminal equipment TE8, desires to communicate, the terminal equipment TE8 writes a request packet into an available mini slot for transmission to the head end 16. Preferably, the upstream channel is utilized for such communication. The head end 16 responds by allocating specified slots to the terminal equipment TE8. The head end 16 then transmits a packet back to the terminal equipment TE8 indicating which slots have been allocated to TE8. Preferably, the downstream channel is utilized for this communication. The terminal equipment TE8 then organizes its data into packets and transmits the packets in the assigned slots of the upstream channel. The head end 16 receives all packets from the upstream channel and transmits the packets in slots of the downstream channel. Each terminal equipment receives each packet transmitted on the downstream channel. If the destination address in the received packet indicates that the packet is destined to the terminal equipment at which the packet is received, the message is extracted from the payload. Otherwise the packet is discarded.

The advantage of TDM over FDM is that bandwidth can more easily be allocated in a variety of granularities to terminal equipments as needed. However, such bandwidth allocation algorithms are complex and difficult to implement. TDM is disadvantageous because a large time overhead is needed for resolving contentions in accessing the mini slots. Not also that the head end 16 must clearly identify slot boundaries in the upstream channel. However, the time alignment of each packet bearing signal will vary depending on the propagation delay of the path over which the signal was transmitted. Consider that the path lengths between the head end 16 and each terminal equipment TE1–TE20 can widely vary from terminal equipment to terminal equipment in a deployed cable network 10. As such, the propagation delays, which depend on the path lengths, also vary over a large range. To offset such a wide variance in propagation delays, a large (time) spacing between slots (or "interframe gap") is required, which large spacing dramatically reduces the bit rate of the upstream channel.

Polling

Polling is a simple technique for ensuring that more than one terminal equipment TE1–TE20 does not attempt to access a communication channel at the same time. An example of a polling technique is employed in the High-level Data Link Control (HDLC) protocol. According to a polling technique, each terminal equipment TE1–TE20 is periodically "polled," by the head end 16. That is, the head end 16 sends a control message to the each terminal equipment, one at a time, which control message enables the terminal equipment to transmit a message on a channel or subchannel. Polling ensures that only one terminal communicates at a time on a channel or subchannel, namely, the polled terminal equipment, thereby resolving contentions to utilize the shared channel or subchannel. The problem with the polling technique is that thousands of terminal equipments are likely to be connected to the head end 16. Thus, a large mount of time is required to poll each terminal equipment (assuming that the delay between successive pollings must be kept acceptably low) thereby drastically reducing the residual bit rate available for communication.

Random Access

Contention resolution techniques utilized in ALOHA, Carrier Sense Multiple Access (CSMA) and Carrier Sense Multiple Access with Collision Detection (CSMA/CD) fall into this category. According to a random access technique, each terminal equipment attempting to utilize a shared channel or subchannel monitors the channel or subchannel to determine when it is "idle." (In the case of Ethernet, which employs CSMA/CD in a LAN environment, communication in a channel is achieved by transmitting a baseband signal on the shared medium. A channel is "idle" when no baseband signal is detected as present on the shared medium by the device that monitors the channel). When the channel or subchannel is sensed idle, the terminal equipment transmits its signals on the channel. At the same time, the terminal equipment monitors the channel to determine if during the course of transmitting its signal, another device (e.g., terminal equipment, head end, etc.) has also transmitted on the channel. If so, a collision occurs, meaning that the signal transmitted by the terminal equipment is deemed not to have been received by virtue of interference from the other signal. In response to a collision, the terminal equipment waits for some period of time (e.g., as determined by the well-known exponential back-off algorithm) that depends on the "maximum round trip propagation delay" of the network, and then attempts to re-transmit the signal.

Collisions can occur because there is a signal propagation delay on the shared medium between the terminal equipment and each other device. For example, a signal transmitted by the terminal equipment TE1 on the shared medium 18 will not be received or detected at the terminal equipment TE20 until after some delay based on the distance of the path over which the signal propagates from the terminal equipment TE1 to the terminal equipment TE20. Propagation delays are important because they control the likelihood of collisions and the amount of time during which terminal equipments must wait in response to detecting collisions.

Often, a useful measure of propagation delay in a network is the so-called "maximum propagation delay" equal to the maximum of the propagation times of the signals transmitted between each pair of communicating devices (e.g., head end or terminal equipments). The maximum propagation delay usually depends on the "maximum segment length" or the sum of the lengths of the shared medium links between the two most distant communicating devices.

The collection of devices, that can mutually cause collisions with each other device in the collection, and the portion of the shared medium that interconnects the devices in the collection, is referred to as a collision domain or network segment. In each of the cable network proposals, each terminal equipment connected to a head end via a shared medium can effectively cause a collision with each other terminal equipment. Thus, effectively, only a single cable network segment or cable segment is defined.

The random access method is commonly used in Ethernet networks where the maximum length of cable between two devices is limited to 200–2500 meters for unshielded twisted pairs of wires. In contrast, a cable network 10 typically covers several tens of kilometers. Many device to device cabling distances can therefore exceed ten kilometers. Moreover, the distance between the furthest terminal equipments and the head end alone can be over ten kilometers. Thus, the maximum propagation delay is far too excessive to allow very high bit rate communication under such a contention scheme. In addition, the number of terminal equipments attached to the cable network can be on the order of 10,000. As the number of communicating devices increases, the probability of a collision also increases. Thus, far too many collisions are likely to occur to enable effective communication.

It is an object of the present invention to overcome the disadvantages of the prior art.

SUMMARY OF THE INVENTION

This and other objects are achieved according to the present invention. An illustrative environment of use of the invention is a cable network including a head end, a shared medium connected to the head end and multiple terminal equipments, e.g., data communication capable set top boxes, connected to the head end via the shared medium. The shared medium may be formed from links made of coaxial cable or optical fiber. The terminal equipments and head end are connected to the shared medium in a tree configuration with the head end at the root and the terminal equipments at the leaves. The head end illustratively transmits multiple carrier signals that are received by each terminal equipment. One or more of the carrier signals are used to transmit one analog broadcast program or one or more digital broadcast programs. Illustratively, excess bandwidth not used to deliver broadcast programs to each terminal equipment is available for use in data communication by the terminal equipments.

According to one embodiment, each terminal equipment connected to the head end via the shared medium is organized into plural cable segments. Illustratively, one or more bridges are provided for communicating packets originating in a cable segment but destined outside of that cable segment. A first carrier frequency is allocated for only intra cable segment communication. A second carrier frequency is allocated for only upstream directed inter cable segment communication. A third carrier frequency is allocated for only downstream directed communication. Each terminal equipment transmits and receives packets that are modulated on carrier signals, having only the first carrier frequency. Each bridge connected to one of the cable segments transmits packets destined outside of its connected cable segment that are modulated on a carrier signal having only the second carrier frequency. Each bridge receives packets destined to the connected cable segment, but originating outside of the connected collision domain, that are modulated on a carrier signal having only the third carrier frequency. Illustratively, each bridge receives from a downstream bridge packets that are modulated on carrier signals having the second carrier frequency and transmits upstream such packets modulated on a carrier signal having the second carrier frequency.

According to another embodiment, at least one bridge is provided that is connected to a first cable segment of the cable network. The bridge receives from a shared communication medium a first carrier signal, having a first carrier frequency that is allocated for intra cable segment packet communication, containing packets modulated thereon. The bridge demodulates selected packets originating in the first cable segment from the first carrier signal and determines if each such selected packet is destined outside of the first cable segment. The bridge modulates each of the demodulated packets, that are destined outside of the first cable segment, onto a second carrier signal having a second carrier frequency, that is allocated for upstream directed inter cable segment communication. The bridge then transmits the second carrier signal on an upstream link of the common shared medium.

Illustratively, the terminal equipments are organized into cable segments in a fashion that limits the "maximum segment length," i.e., the longest signal path between two terminal equipments, to a certain threshold maximum length. Such a length is chosen to minimize the maximum propagation delay, so as to enable a desired maximum bit rate for the terminal equipments. In addition, local intra cable segment traffic is isolated from each other cable segment, thereby decreasing the likelihood of collisions and increasing the overall communication throughput in the cable network. Most notably, because each bridge can be provided with buffering capacity, terminal equipments need not accommodate the possibility of collisions incurred from distant terminal equipments. Rather, such distant terminal equipments are likely to be in other cable segments, and can communicate contemporaneously in their respective cable segments in an isolated fashion. As a result, the bit rate of wide-band communication in the cable network is maximized.

DETAILED DESCRIPTION OF THE INVENTION

Figure 1:
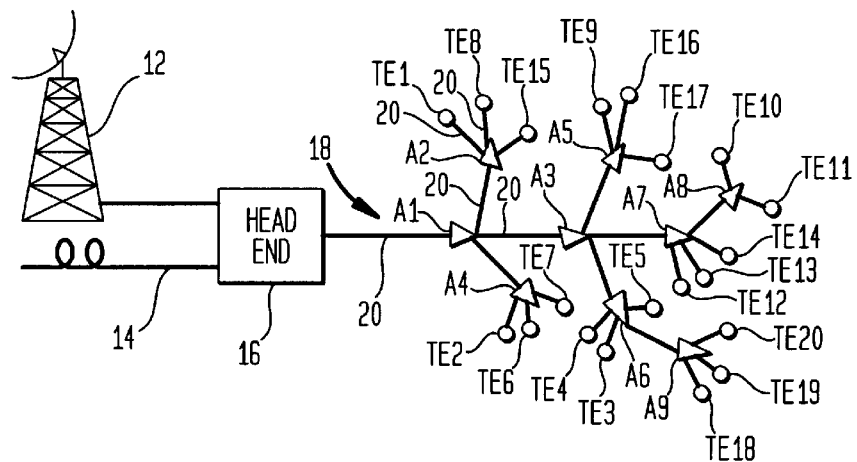
FIG. 1 shows a conventional cable network.
Figure 2:
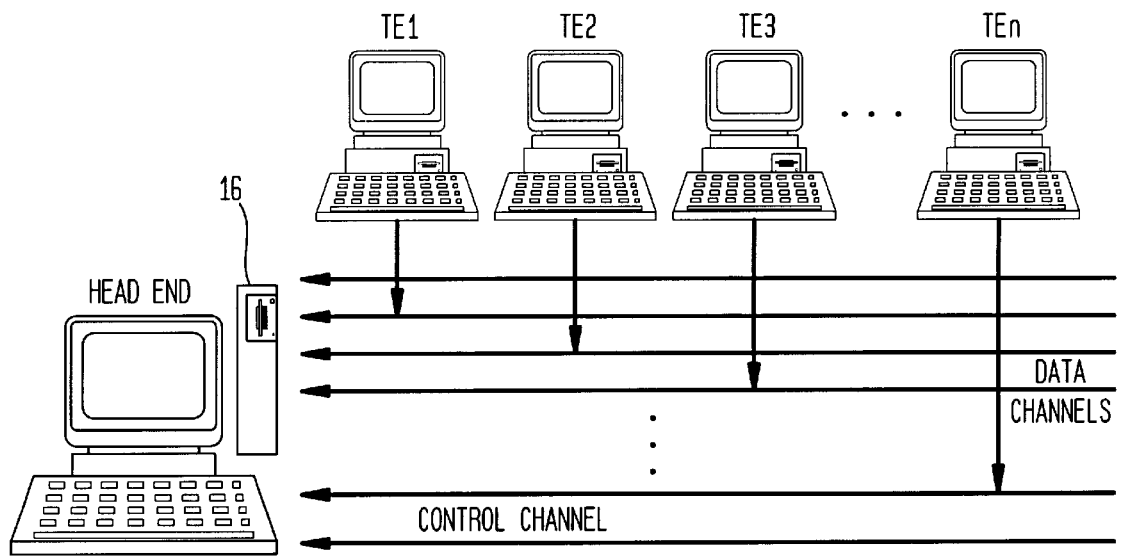
FIG. 2 shows a conventional FDM channel allocation.
Figure 3:
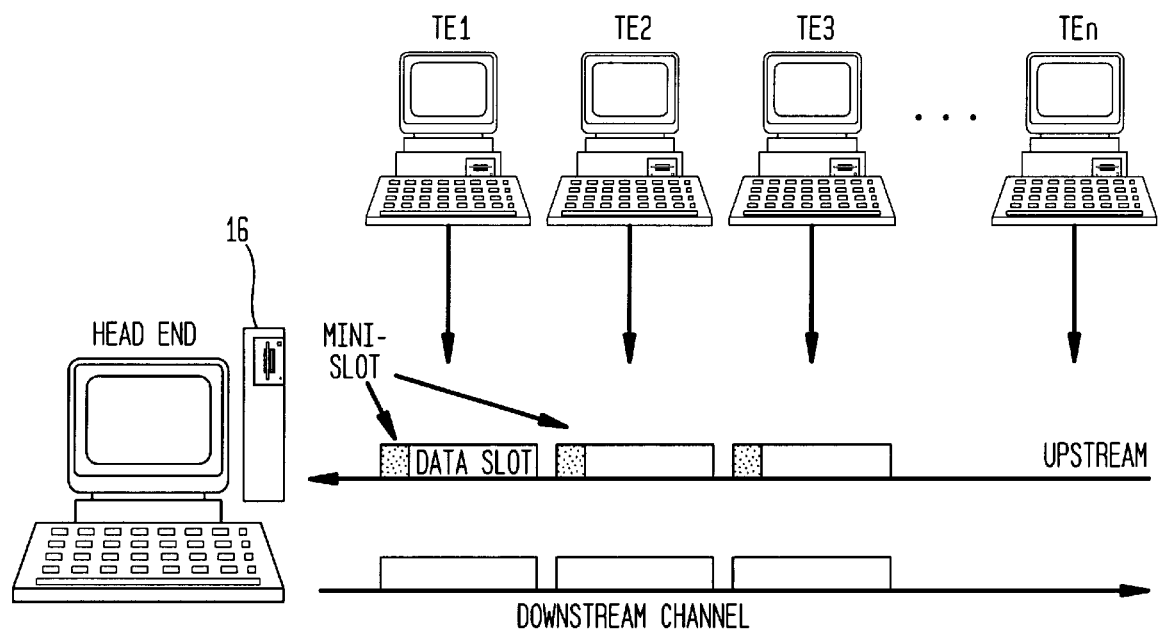
FIG. 3 shows a conventional TDM channel allocation.
Figure 4:
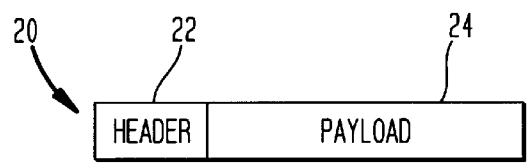
FIG. 4 shows a conventional packet.
Figure 5:
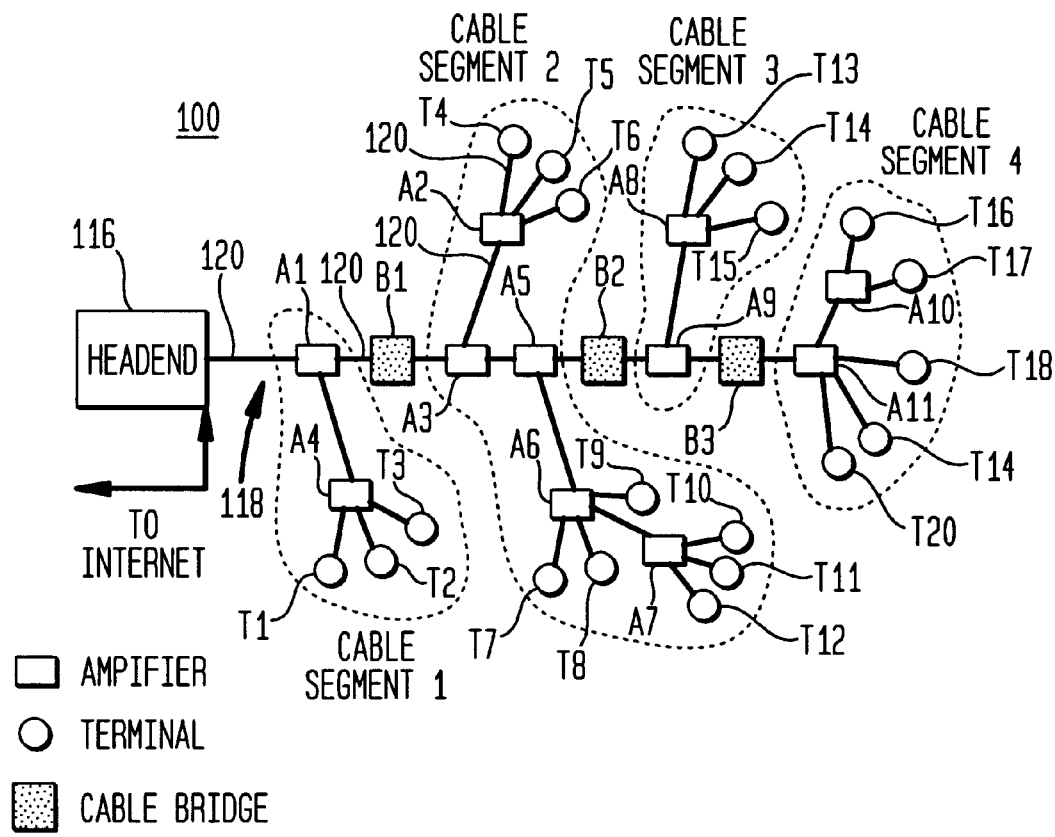
FIG. 5 shows a cable network according to an embodiment of the present invention.

Referring to FIG. 5, a cable network 100 according to the present invention is depicted. The cable network 100 includes a head end 116, a shared medium 118, amplifiers Al-A 1, terminal equipments T1–T20 and bridges B1–B3 (the purpose of which is described below). As shown, the head end 116, amplifiers A1–A11, terminal equipments T1–T20 and bridges B1–B3 are connected in a tree topology, with the head end at the root of the tree and the terminal equipments T1–T20 at the leaves. As before, the shared medium 118 includes individual links 120 which may be coaxial cables and optical fibers. The upstream and downstream connection of the head end 116, bridges B1–B3, amplifiers A1–A1 and terminal equipments is summarized in Table 1, Table 2, and Table 3.

TABLE 1

| Bridge | B1 | B2 | B3 |
|---|---|---|---|
| upstream | A1 | A5 | A9 |
| downstream | A3 | A9 | A11 |

TABLE 2

| Amplifier | A1 | A2 | A3 | A4 | A5 | A6 |
|---|---|---|---|---|---|---|
| upstream | head end | A3 | B1 | A1 | A3 | A5 |
| downstream | A4, B1 | T4, T5, T6 | A2, A5 | T1, T2, T3 | B2, A6 | A7, T7, T8, T9 |

TABLE 3

| Amplifier | A7 | A8 | A9 | A10 | A11 |
|---|---|---|---|---|---|
| upstream | A6 | A9 | B2 | A11 | B3 |
| downstream | T10,T11,T12 | T13,T14,T15 | B3,A8 | T16,T17 | A10,T18,T19,T20 |

For sake of convenience, the satellite downlink and trunk line to the head end 116 are omitted. However, a link to the internet is provided. The head end 116 is preferably attached to the internet backbone. However, the head end 116 may be attached to the internet 116 via another network owned by an internet service provider or network access provider.

Unlike the cable network 10, the terminal equipments T1–T20, the individual links 120 of the share medium 118 to which they are attached and the amplifiers A1–A11, are organized into multiple network segments referred to as cable segments CS1, CS2, CS3 and CS4. Table 4 summarizes the organization of the terminal equipments and amplifiers into cable segments.

TABLE 4

| Cable segment | Included Terminal Equipments and Amplifiers |
|---|---|
| CS1 | A1,A4,T1,T2,T3 |
| CS2 | A2, A3, A5, A6, A7, T4, T5, T6, T7, T8, T9, T10, T11, T12 |

TABLE 4-continued

| Cable segment | Included Terminal Equipments and Amplifiers |
|---|---|
| CS3 | A8, A9, T13, T14, T15 |
| CS4 | A10, A11, T16, T17, T18, T19, T20 |

Each terminal equipment within a particular cable segment CS1–CS4, e.g., the terminal equipment T4 in CS2, can transmit signals directly to, and receive signals directly from, only each other terminal in its segment, i.e., the terminal equipments T5–T12, and the bridge B1 connected upstream of the cable segment CS2. In addition to the other roles described below, the head end 116 also functions as the bridge for the cable segment CS1. The manner in which such communication is achieved is described below. As a direct result, each terminal equipment can only cause collisions with the other terminal equipments and its respective upstream attached bridge.

The bridges B1–B3 isolate each cable segment from each other cable segment, thereby preventing transmissions from terminal equipments in a downstream attached cable segment from interfering with transmissions by terminal equipments in an upstream attached cable segment. Thus, the bridge B1 isolates its downstream attached cable segment CS2 from the upstream attached cable segment CS1. Furthermore, as described below, the bridges B1–B3 enable inter cable segment communication for one or more cable segments served by that bridge. In FIG. 5, bridge B1 serves CS2, bridge B2 serves CS3 and bridge B3 serves CS4. Cable segment CS1 is served by head end 116 which also functions as a bridge for CS1.

In the cable network 100, the bridges B1–B3 are connected linearly along a single branch of the tree topology. This was done merely for sake of simplicity in the queuing analysis provided below. In a more general topology, the bridges B1–B3 may be connected along multiple branches of the tree topology.

Figure 6:
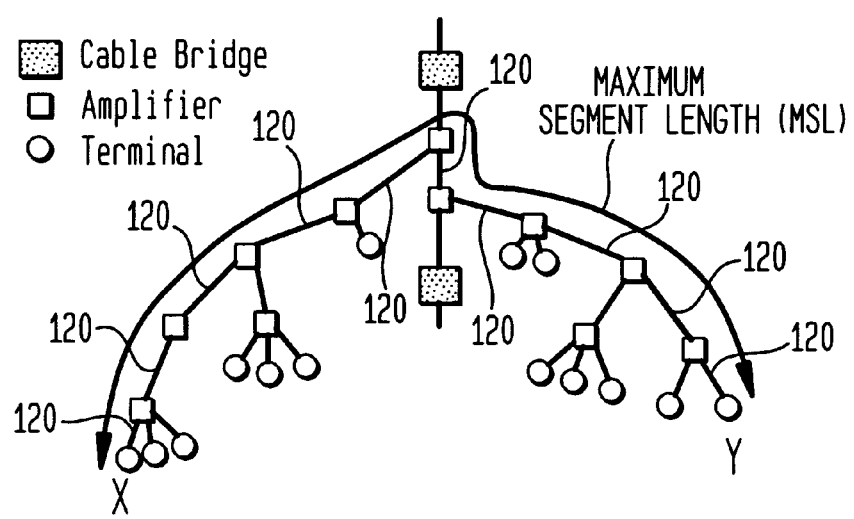
FIG. 6 shows the maximum segment length.

The organization of terminal equipments into cable segments is performed in a manner such that the "maximum segment length" (some times referred to as the collision domain diameter) is less than some threshold maximum length. The maximum segment length refers to the longest signal propagation path between two terminal equipments. For example, a cable segment CS is shown in FIG. 6. Two terminal equipments X and Y are shown for which the sum of the lengths of the links 120 of the shared medium 118 separating the two terminal equipments X and Y is the greatest in the cable segment CS. This sum of the lengths is referred to as the maximum segment length or MSL. In other words, the signal propagation path between each other pair of terminal equipments in CS is shorter than the MSL. In organizing the terminal equipments, the MSL must be less than some predetermined threshold. The threshold may be set to achieve a particular bit rate—using a shorter MSL threshold increases the bit rate. Table 5 shows a comparison of the MSL for 100 BASE Ethernet, 10 BASE Ethernet, two unsegmented cable networks (CATV 1 and CATV 2) and two examples of cable networks with multiple cable segments according to the present invention. The CSMA/CD random access protocol is assumed to be used. The table indicates the required (or assumed) MSL threshold, the round trip propagation delay associated with such a network, and the maximum data throughput that can be achieved in the network.

TABLE 5

| Network Architecture | MSL threshold | Round trip propagation delay | Max. Throughput |
|---|---|---|---|
| 100 BASE Ethernet | 250 m | 5.12 μsec | 100 Mbits/sec |
| 10 BASE Ethernet | 2.5 km | 51.2 μsec | 10 Mbits/sec |
| CATV 1 | 12.5 km | 256 μsec | 2 Mbits/sec |
| CATV 2 | 25 km | 512 μsec | 1 Mbits/sec |
| Segmented cable 1 | 500 m | 10.24 μsec | 50 Mbits/sec |
| Segmented cable 2 | 1 km | 20.48 μsec | 25 Mbits/sec |

As shown, a lower maximum round trip propagation delay can be achieved in both examples of a segmented cable network according to the present invention than an unsegmented cable network CATV 1 or CATV 2 or even a 10 BASE Ethernet local area network. This translates to a higher data throughput. Again, such a result occurs because the maximum round trip propagation delay effects both the spacings between slots and the packet retransmission delay after detecting a collision.

Figure 7:
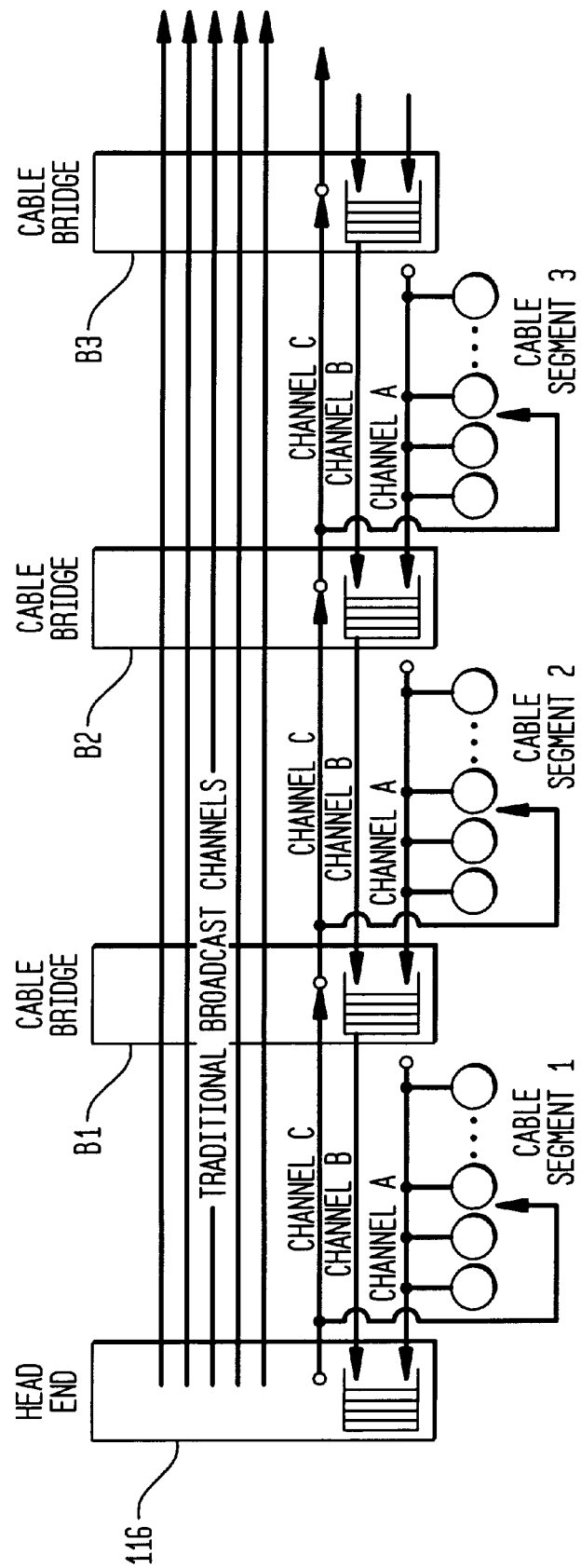
FIG. 7 shows the channel allocation according to an embodiment of the invention.

FIG. 7 shows a "logical bus" depiction of the segmented cable network 100 of FIG. 5. Note that the actual topology of the cable network 100 is a tree configuration. FIG. 7 is a simplified picture for use in describing the allocation of carrier frequencies and communication using such carrier frequencies. As shown, the head end 116 transmits so-called "traditional broadcast channels" for communicating programs to each terminal equipment. That is, the broadcast channels are contemporaneously received by each terminal equipment T1–T20 and contain ordinary programming information. Each such channel is preferably implemented using 6 MHZ bandwidth carrier signals with different carrier frequencies. Preferably, the broadcast channels are allocated according to the DAVIC proposal wherein the carrier signals in the 50–450 MHZ band carry analog programs (such as conventional television channel programming) and wherein the carrier signals in the 450–750 MHZ band carry digital programs (such as MPEG-2 programs).

Also shown are three channels labeled A, B and C. The channels A, B and C are each allocated mutually different carrier frequencies and mutually non-overlapping sub-bands. Preferably, these carrier frequencies and sub-bands are selected in the 5–45 MHZ band as per the DAVIC standard. As such, each of the channels A, B and C can simultaneously carry data communication and can carry data communications simultaneously while the traditional broadcast channels carry broadcast programming. Illustratively, a QPSK or QAM modulation technique with forward error correction is used for terminal equipment data communication.

Each of the channels A, B and C is allocated for a different purpose. The channel A (and its associated carrier frequency) is allocated for only intra cable segment communication. In other words, the transmissions on channel A in each cable segment (e.g., the cable segment CS2) are isolated from each other cable segment (e.g., cable segments CS1, CS3 and CS4). The terminal equipments T1–T20 are only permitted to transmit and receive packet bearing signals on channel A.

The bridges B1–B3 receive the packet bearing signals transmitted on channel A but only from the links of the shared medium belonging to the attached downstream cable segment or segments that each bridge serves. Thus, bridge B1 receives packets from CS2 via channel A but does not receive packets from CS1 via channel A. Each bridge determines whether or not each transmitted packet is destined to a destination outside of the downstream attached cable segment served by that bridge. If so, the bridge transmits the packet on channel B as described below. Otherwise, the bridge B1–B3 discards the packet. For reasons discussed below, the bridges B1–B3 may also purposely cause collisions in order to control the rate of receipt of packets at the bridges B1–B3.

In addition, the bridges B1–B3 receive packet bearing signals from channel C including one or more packets that are destined to destinations in the downstream attached cable segment served by the bridge (as described below). In such cases, the bridges B1–B3 transmit each packet destined to the downstream attached cable segment served by the bridge on channel A, but only via the links to that cable segment containing the destination of the packet.

The channel B (and its associated carrier frequency) is allocated only for upstream directed communication of packets to a destination outside of the cable segment from which the packet originated. The bridges B1–B3 may receive packet bearing signals transmitted on channel B, but only from a downstream link of the shared medium. The bridges B1–B3 transmit such received packets via channel B on the upstream link 120 of the shared medium 118. Generally speaking, the bridges B1–B3 do not transmit signals using channel B on a downstream link 120 of the shared medium 118 except for purposely causing a collision, as described below. In addition, the bridges B1–B3 may receive packets on channel A from the downstream cable segment to which they are connected that are destined outside of the cable segment. The bridges B1–B3 transmit such inter cable segment packets received from channel A, via channel B on the upstream directed link.

The cable head end 116 receives all packet bearing signals transmitted on the channel B. The head end 116 determines whether or not each packet received from channel B is destined to the head end 116, to a destination within the downstream attached cable segment CS1 served by the head end, to a destination in the cable network 100 other than in CS1, or to a destination outside the cable network 100. The head end 116 may process the packets ultimately destined thereto, e.g., extract the messages from the payloads, etc. For example, a terminal equipment may transmit a packet to the head end 116 requesting information (e.g., in a video on demand context) for retrieval. The head end 116 may forward each packet destined outside of the cable network 100 via the internet. Packets destined to a destination in CS1 are transmitted on channel A of the shared medium 118. Packets destined to a destination within the cable network 100, but not within CS1, are transmitted on channel C of the shared medium 118 as described below.

The channel C (and its associated carrier frequency) is allocated only for downstream directed communication of packet bearing signals. The cable head end 116 transmits each packet received from the channel B, that is destined to a destination in the cable network 100 other than in CS1 on the channel C. The head end 116 may also receive packets from the internet destined to destinations in the cable network 100 (other than the head end 116). Each packet received from the internet destined to the cable segment 100 (but not to CS1) are transmitted on channel C. (All received or generated packets at the head end destined to CS1 are transmitted on channel A). In addition, the head end 116 transmits on channel C packets generated at the head end 116 that are destined to a destination in the cable network 100 (other than CS1). For example, as noted above, the terminal equipments can transmit packets to the head end 116 requesting retrieval of information. The head end 116 responds by placing the requested information into packets and transmitting the information on channel C.

Each bridge B1–B3 receives the packets carried on channel C from the upstream link. In response, each bridge B1–B3 transmits the signal received on channel C on each downstream connected link 120 of the shared medium 118. (Note that it is possible to only transmit such channel C signals on downstream links to which other bridges are attached. However, this would require some configuration each time the topology is altered by adding or deleting a bridge.) As such, the packets of channel C propagate on each link 120 of the shared medium 118 to each other bridge B1–B3. In addition, each bridge demodulates the packets from the received channel C carrier signal and determines whether or not any of the demodulated packets are destined for a destination in the downstream attached cable segment served by the bridged. For example, the bridge B1 serves CS2 and determines if any packets demodulated from channel C are destined to a destination in CS2. If so, the packets identified as destined in the downstream attached cable segment are transmitted on channel A via the links 120 to that cable segment. Note that it is possible for a bridge to serve more than one cable segment, in which case the bridge transmits packets destined to a particular cable segment only on links of that cable segment and not on links 120 of the other cable segments.

Figure 8:
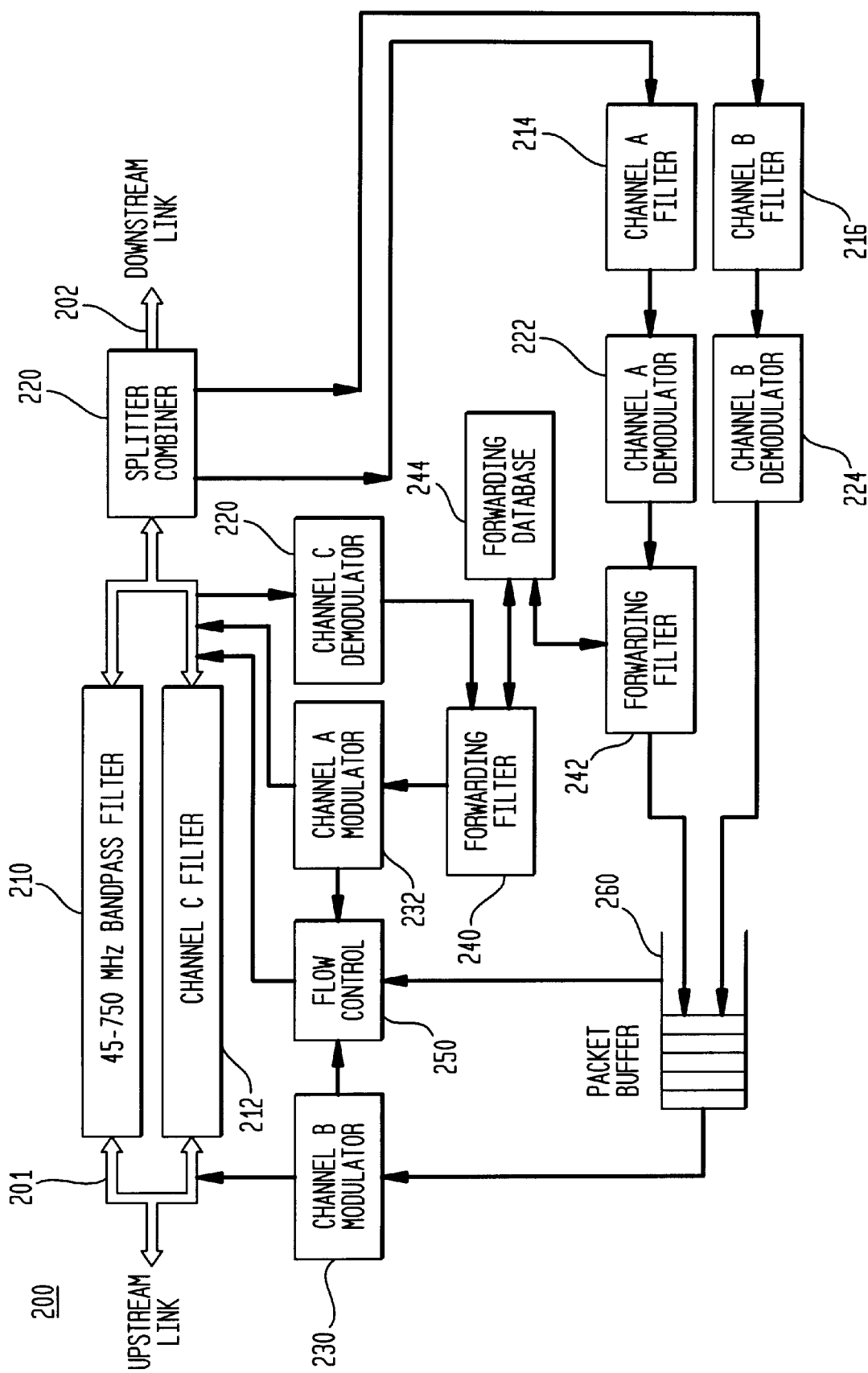
FIG. 8 shows a bridge configuration according to an embodiment of the invention.

Referring now to FIG. 8, the architecture 200 of each bridge B1–B3 is described in greater detail. As shown, one upstream link 201, and one downstream link 202, of the shared medium 118 are connected to the bridge 200. Signals received from upstream link 201 are inputted to a broadcast channel (e.g., 45–750 MHZ bandpass) filter 210 and a channel C filter 212. The signals outputted from these filters therefore include only the traditional broadcast channels and channel C from the upstream link. Channels B and A which may be present on upstream link 201 are entirely filtered out from the signals outputted from these filters 210, 212. The signal outputted from the channel C filter includes only the channel C signal, i.e., a carrier signal having the carrier frequency allocated to channel C on which packets are modulated.

The channel C signal filtered from the upstream link by the channel C filter 212 is inputted to a channel C demodulator 220 which demodulates each packet from the received channel C signal. The demodulated packets are inputted to a forwarding filter 240 which may be implemented by a processor or finite state automata. The forwarding filter 220 examines the destination address of each packet demodulated from the channel C signal and determines if the destination address is for a destination (e.g., a terminal equipment) in the downstream attached cable segment served by the bridge 200. To that end, the forwarding filter 240 may consult a forwarding database 244 of all destination addresses of destinations in the downstream attached cable segment served by the bridge 200. Illustratively, each destination, including each terminal equipment, in the downstream attached cable segment served by the bridge 200 is assigned a unique address, e.g., according to the internet protocol. Each such destination communicates its address to the bridge 200 which stores the address in the forwarding database 244. If the forwarding filter 240 determines that a packet is destined to a destination in the downstream attached cable segment served by the bridge 200, the packet is forwarded to the channel A modulator 232. Otherwise, the packet is discarded.

The channel A modulator 232 modulates each packet received from the forwarding filter 240 onto a carrier signal having the carrier frequency allocated to channel A. The channel C and broadcast program signals outputted from the filters 210, 212 and the channel A modulator 232 are received at a splitter/combiner 220 where they are combined together. The combination of these signals is then outputted on downstream link 202. The splitter/combiner 220 also outputs the signals received from the downstream link 202 to a channel A filter 214 and a channel B filter 216.

The channel A filter 214 filters out the channel A signal. This signal is a carrier signal on which the terminal equipments in the attached downstream cable segment serviced by the bridge 200 transmit their packets. The filtered out channel A signal is inputted to the channel A demodulator 222 which demodulates each packet from the channel A signal. These packets are received by a forwarding filter 242. Some of the packets demodulated from the channel A signal, while originating in the downstream attached cable segment served by the bridge 200, are destined to a destination outside of that cable segment. The forwarding filter 242 examines the destination address of each of the packets demodulated from the channel A carrier signal and determines if they are destined to a destination in the downstream attached cable segment served by the bridge 200. To that end, the forwarding filter 242 accesses the forwarding database 244. If the packets are destined to the same cable segment served by the bridge 200, they are discarded. Otherwise, the packets are stored in the packet buffer 260 for transmission upstream on channel B.

The channel B filter 216 filters out the channel B signal from the group of signals received from the downstream link 202. The filtered out channel B signal is fed to demodulator 224 which demodulates each packet from the carrier signal allocated to channel B. As noted above, these are packets originating from outside of the downstream attached cable segment served by the bridge 200. Each of these packets must be transmitted upstream to the head end 116. Thus, each of the demodulated packets is stored in the packet buffer 260.

The packet buffer 260 is shown as a queue. Preferably, as described below, the packet buffer 260 actually includes multiple queues, including one queue for channel A packets and one queue for channel B packets. The packets are outputted, preferably in first-in first-out order, to the upstream channel B modulator 230. The channel B modulator 230 modulates each packet onto a carrier signal having a carrier frequency allocated to channel B. The modulated channel B signal thus produced is then combined with the signal outputted on upstream link 201.

Considering that the packet buffer 260 has a finite space yet receives packets from two independent channels, namely, channels A and B, it is possible for the packet buffer 260 to overflow. To prevent this from happening, a feedback mechanism is provided for controlling, i.e., temporarily stopping, the receipt of packets on each of the channels A and B. To that end, a measure of the fullness or occupancy of the packet buffer 260 is outputted to flow control circuit 250. Preferably, separate queues are provided for the channel A and channel B packets. In such a case, separate indications of queue fullness or occupancy for the channel A packet queue and the channel B packet queue are outputted to the flow control circuit 250. When the packet buffer 260 runs out of space for receiving packets on channel A, the flow control circuit 250 purposely causes collisions to occur on channel A. This can be achieved by outputting a jamming signal on the carrier signal on channel A via the downstream link 202 simultaneously while detecting a channel A signal on channel A of the downstream link 202 transmitted by another device. Likewise, when the packet buffer 260 runs out of space for receiving packets on channel B, the flow control circuit 250 purposely causes collisions to occur on channel B. This can be achieved by outputting a jamming signal on the carrier signal on channel B via the downstream link 202 simultaneously while detecting a channel B signal on channel B of the downstream link 202 transmitted by another device. As shown, each of the modulators 230 and 232 outputs a dummy packet signal (as a jamming signal) to the flow control circuit 250 for purposes of transmitting such an interfering, collision inducing signal.

Two aspects of the bridge architecture 200 should be noted. First, the filters 210 and 212 ensure that the channel B signal generated in the bridge 200 is transmitted only on the upstream link 201. These filters 210 and 212 also ensure that any channel A signal on the upstream link 201 is not transmitted on a downstream link. 202 Furthermore, the filters 210 and 212 ensure that the channel B signal received on the downstream link 202 is not transmitted on the upstream link 201 and that the channel A and B signals transmitted on the downstream link 202 are only transmitted on the downstream link 202. Thus, the bridge isolates the downstream attached cable segment that it serves. Second, if the bridge 200 experiences a failure, then traditional broadcast channels are still delivered from the upstream link 201 to the downstream link 202 by virtue of the filter 210.

Figure 9:
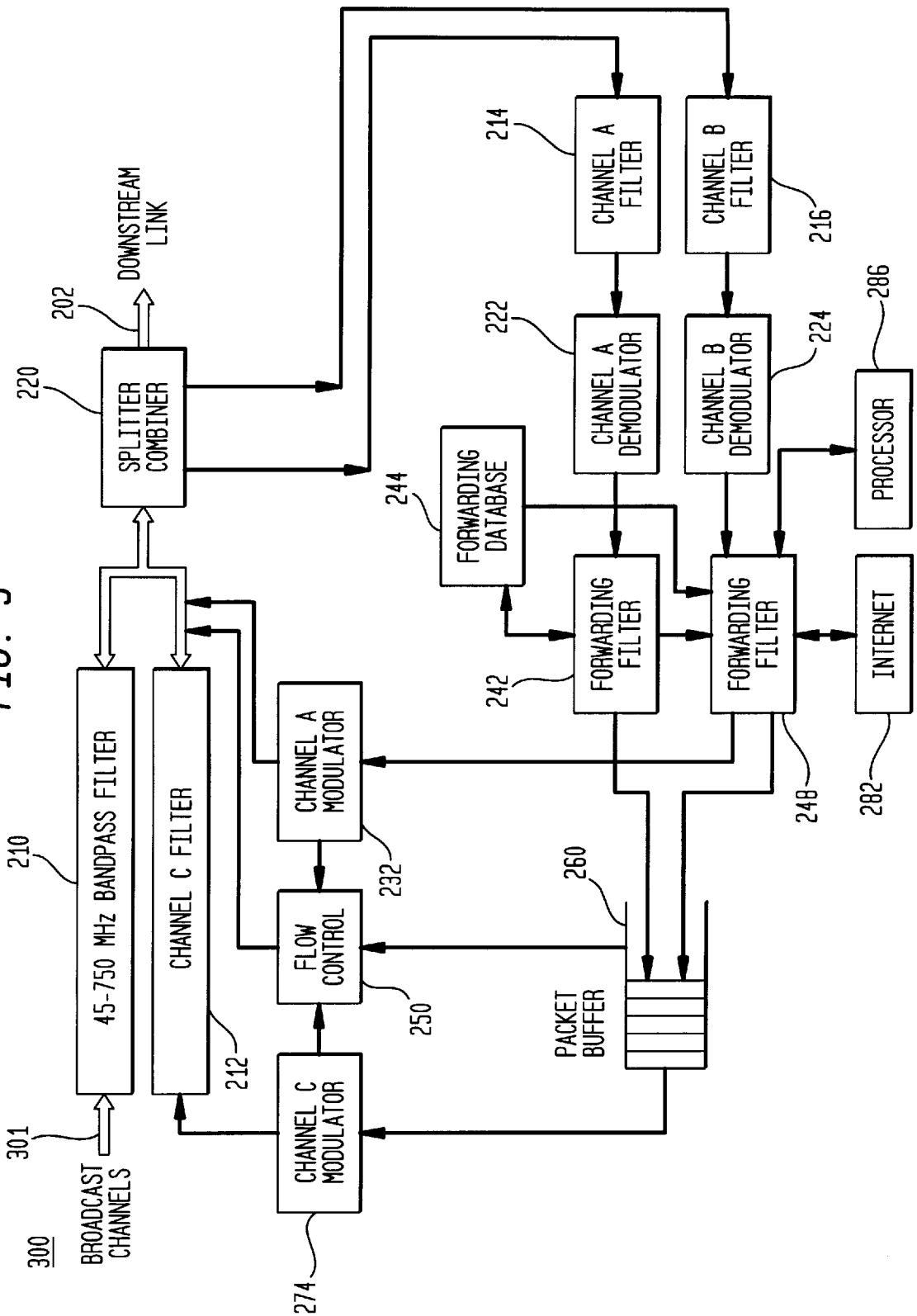
FIG. 9 shows a head end configuration according to an embodiment of the invention.

FIG. 9 depicts a head end architecture 300 according to an embodiment of the present invention. The head end architecture 300 is very similar to the bridge architecture 200 and therefore only the differences are described. First, packets demodulated from a channel B signal received from the downstream link 202 of the shared medium are inputted to a forwarding filter 248. Likewise, packets received from the internet 282, or locally generated by processor 286, are outputted to forwarding filter 248. The forwarding filter 248 determines if the packets are destined to:

(a) a destination in the downstream attached cable segment CS1 served by the head end 300/116,
(b) the cable head end 116/300,
(c) the internet, or
(d) a destination in cable network 100 other than in the downstream attached cable segment CS1 served by the head end 116/300.

A forwarding database 244 is consulted which can store the destination address of all destinations in the cable network 100, the destination address of the head end 116 and other appropriate destination address. Packets destined to a destination in the downstream attached cable segment CS1 served by the head end 116/300 are outputted to the channel A modulator 232. Packets destined to the cable head end 116/300 are outputted to the processor 286. Packets destined to the internet are outputted to internet connection 282. Packets received from channel B and destined to a destination in cable network 100 other than CS1 are inputted to a channel C queue of the packet buffer 260. Also inputted to a channel A queue of the packet buffer 260 are packet received from channel A destined to another destination in cable network 100 but not CS1. (Other packets received from channel A not destined to a destination in cable network 100 may be outputted to forwarding filter 248 for further forwarding.) Additional queues may be provided for packets from other sources. The packets are retrieved from the packet buffer 260 and modulated onto a channel C carrier signal (having the carrier frequency allocated to channel C). This signal is inputted to filter 212. Note that filter 210 receives the traditional broadcast channels as locally generated by the head end 116/300. The flow control circuit 250 can cause collisions on channel A in CS1 when the channel A queue of the packet buffer 260 is full. The flow control circuit 250 can also cause collisions on channel B when the channel C queue is full.

An example is now considered with reference to FIGS. 5, 7, 8 and 9. Suppose TE3 desires to transmit a packet to TE2. TE3 generates a packet and modulates the generated packet onto a carrier signal having the carrier frequency allocated to channel A. TE3 senses the channel A of its connected shared medium link 120 to determine when the channel A is idle (no signal having the carrier frequency assigned to channel A is detected on the shared medium link 120). TE3 transmits the signal on channel A. While transmitting the signal, TE3 monitors channel A for a collision, i.e., another interfering carrier signal having the same channel A carrier frequency transmitted simultaneously. Assume first that no collision is detected. The channel A signal is received at head end 116, TE1 and TE2. Head end 116, TE1 and TE2 receive the signal from channel A and demodulate the packet from the channel A carrier frequency. The head end 116, TE1 and TE2 then compare the destination address of the packet to their own respective destination addresses for a match. Since no match is detected at the head end 116 and TE1, the head end 116 and TE1 discard the packet. (To be more precise, the head end 116 determines that the packet from channel A is also destined to a destination in channel A and therefore discards the packet.) On the other hand, TE2 detects a match and accepts the packet.

Assume now that a collision is detected. TE3 may illustratively transmit a jamming signal on channel A for a specified time period as per the CSMA/CD protocol. TE3 then waits a random amount of time according to the well-known exponential back-off algorithm and attempts to re-transmit its packet. Illustratively, TE3 may attempt to retransmit its packet a certain number of times before aborting the communication.

Consider now a case where T17 desires to communicate with head end 116. T17 generates a packet and transmits the packet on channel A. Bridge B3, which serves cable segment CS4 containing T17, filters out the channel A signal from the other signals received via the downstream link 202 in filter 214 and demodulates the packet from the channel A carrier signal (having the channel A carrier frequency) using demodulator 222. Forwarding filter 242 determines that the demodulated packet is an inter cable segment packet, i.e., destined outside of CS4. The packet is temporarily buffered in packet buffer 260, modulated onto a channel B carrier signal, having the channel B carrier frequency, by modulator 230 and transmitted on upstream link 201 to bridge B2.

The bridge B2 receives, on its downstream link 202, all of the signals transmitted from bridge B3. The channel B carrier signal is filtered out of these signals in channel B filter 216 and the packet is demodulated from the channel B carrier signal in demodulator 224. The packet is temporarily stored in packet buffer 260, modulated onto a channel B carrier signal, having the channel B carrier frequency, using modulator 230 and transmitted on upstream link 201 to bridge B1. A similar process is repeated at bridge B1.

At head end 116/300, the channel B carrier signal is filtered out by the filter 216 and the packet is demodulated by the demodulator 224. The forwarding filter 248 determines that the packet is destined to the head end 116/300 and outputs the packet to processor 286.

The case where the packet is destined to the internet is similar to the above described example except that the forwarding filter 248 outputs the packet to the internet connection 282.

Consider now the case where TE17 transmits a packet destined to TI in the downstream attached cable segment CS1 served by the head end 116/300. The steps carried out are similar to those carried out for transmitting a packet from T17 to the head end 116/300 with the following differences. In the head end 116/300, the forwarding filter 248 determines that the packet is destined to a destination in CS1 and outputs the packet to channel A modulator 232. Channel A modulator 232 modulates the packet onto a channel A carrier signal and transmits the signal to the splitter/combiner 220 (when the channel A is idle) where it is combined with the channel C signal and the traditional broadcast channels. These signals are transmitted on downstream link 202. T1 receives the channel A carrier signal, demodulates the packet, matches the destination address of the packet to its own and accepts the packet.

Consider now the case where T17 desires to transmit a packet to T14. The operation is very similar to the case where the packet is transmitted from T17 to the head end 116/300 with the following differences. In the head end 116/300, the forwarding filter 248 determines that the packet is destined to the cable network 100 but not to CS1, the downstream attached cable segment served by the head end 116/300. As such, the packet is temporarily stored in buffer 260 and modulated onto a channel C carrier signal by channel C modulator 274. The channel C carrier signal thus formed is transmitted on channel C to filter 212, combined with the broadcast program channels in splitter/combiner 220 and transmitted via the downstream link 202 to which the bridge B1 is connected.

The signals are received at the upstream link 201 of bridge B1. The signals are filtered by filters 210 and 212 and then recombined by splitter/combiner 220. The signals thus combined are transmitted on downstream link 202. In addition, the channel C carrier signal filtered out from filter 212 is inputted to channel C demodulator 220. The demodulator 220 demodulates the packet from the channel C carrier signal and the forwarding filter 240 attempts to match the destination address of the demodulated packet to the destination address known to be contained in the downstream attached cable segment CS2 served by the bridge B1/200. Since no match is found, the packet is discarded.

The signals outputted from bridge B1 are received at the upstream link 201 of bridge B2/200. In bridge B2, the channel C filter 212 filters out the channel C carrier signal and the channel C demodulator 220 demodulates the packet. The packet is inputted to the forwarding filter 240 in the bridge B2/200, which determines that the destination address of the packet matches a destination address of a destination in the downstream attached cable segment CS3 served by bridge B2/200. As such, the packet is outputted to channel A modulator 232 which modulates the packet onto a channel A carrier signal. When the channel A is idle, the channel A modulator 232 transmits the channel A carrier signal on channel A to the splitter/combiner 220. The splitter/combiner 220 combines the channel A carrier signal with the other signals it receives and transmits the signals via the downstream link 202. The channel A carrier signal is received by T14, which demodulates the packet, matches the destination address to its own and accepts the packet.

In the cable network 100 according to the invention, CSMA/CD is used within channel A of each cable segment CS1–CS4 as a contention resolution technique. CSMA/CD is merely used as an example in our invention; any contention resolution protocol can be used within each channel A of cable segments CS1–CS4. On the other hand, no contention resolution is utilized in the channel B. (No contention resolution is utilized for channel C either. However, only the head end 116 transmits on channel C. Furthermore, the maximum throughput on channel B is fixed and known ahead of time. As such, channel C presents fewer scheduling concerns.)

Care should be taken in scheduling transmissions on the B channel to ensure that each bridge B1–B3 has an opportunity to communicate and to prevent buffer overflows of the packet buffer queues in the bridges B1–B3. As noted above, each bridge B1–B3 can prevent buffer overflows of the queues by causing collisions. However, if such collisions are incurred without restraint, an upstream bridge usurps an unfair fraction of the channel B bandwidth and starves each of the downstream bridge communications.

Figure 10:
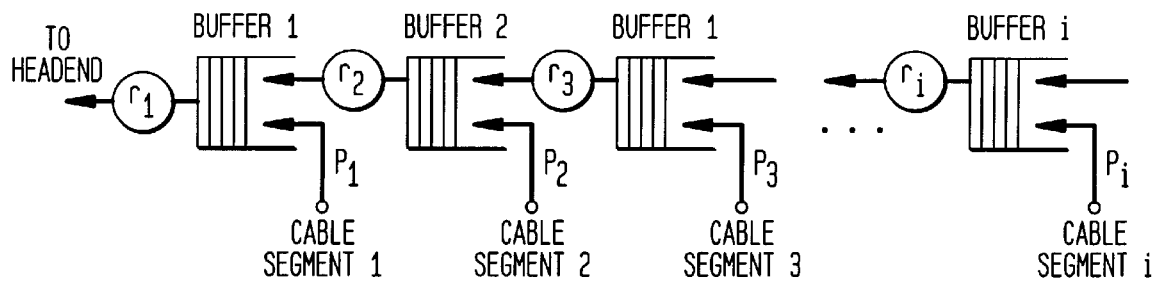
FIG. 10 shows a tandem queuing model according to an embodiment of the invention.

To illustrate this problem, the following analysis is provided. Suppose that the queues of the buffers (hereinafter "buffers") of the bridges are modeled by a tandem queuing system such as is shown in FIG. 10. In FIG. 10, n total bridges are presumed. Each $i^{th}$ buffer is located in a respective $i^{th}$ bridge that serves a corresponding $i^{th}$ cable segment. The bridges are numbered 1 ... n from the upstream-most bridge to the downstream-most bridge. An $i^{th}$ server is provided for each $i^{th}$ buffer which transmits packets to the next, i.e., $(i-1)^{th}$ buffer at a service rate of $r_i$. Likewise, the $i^{th}$ cable segment produces packets for storage in the buffer at a rate $\rho_i$. Suppose buffer i is loaded with packets arriving at a rate of $r_{i+1}+\rho_i$. When $r_{i+1}+\rho_i>r_i$ the buffer i receives packets at a higher rate than it can output packets and an infinite queue length (buffer overflow) will occur.

The transmission rate of channel B is likely to be fixed. The service rate $r_i$ for each buffer i can be presumed to be 1. Assume further that each $i^{th}$ cable segment produces packets at the same rate $\rho_i=\rho$. Under these assumptions, the queuing system is a standard "M/D/1" queuing system with a mean queue $\overline{q}$ length of:

$$\overline{q} = \frac{\rho}{1-\rho} - \frac{\rho^2}{1(1-\rho)}$$

The $i^{th}$ buffer receives packets at the rate of $(n-i+1)\cdot\rho$. The buffers can be modeled as a single server system with a deterministic rate of $(n-i+1)^{-1}$ with a packet arrival rate of $\rho$. Let $\overline{q_i}$ represent the mean queue length of the buffer i. The buffers can be approximated by the mean queue length $\overline{q_i}$ of the M/D/1 system, with a service rate $r_i=1$, an input packet receipt rate of $\rho\cdot(n-i+1)$, given by:

$$\overline{q_i} = \frac{\rho\cdot(n-i+1)}{1-\rho\cdot(n-i+1)} - \frac{\rho^2\cdot(n-i+1)^2}{2(1-\rho\cdot(n-i+1))}$$

Figure 11:
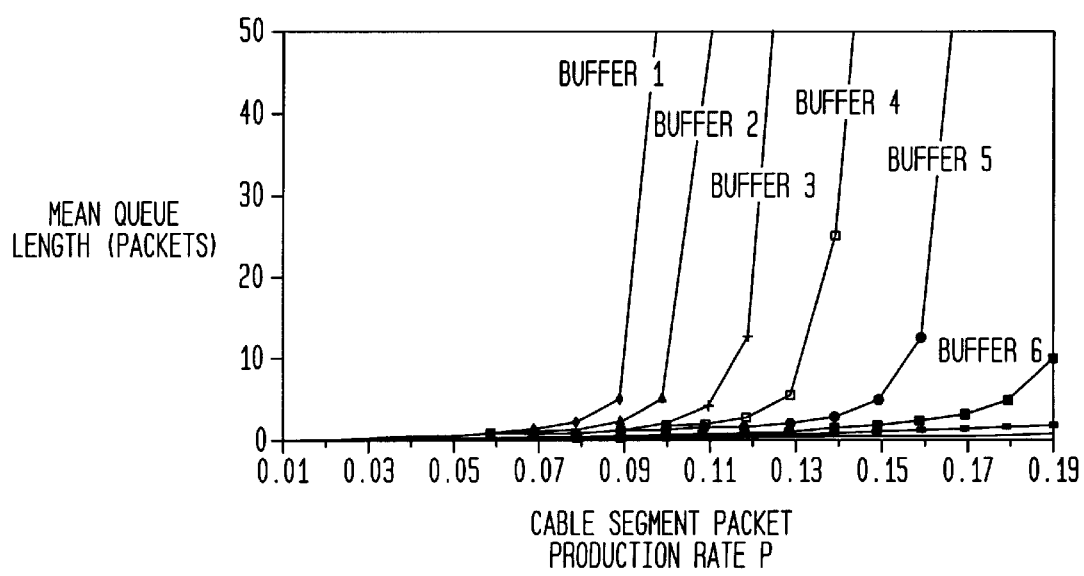
FIG. 11 plots mean queue length in the bridges of FIG. 10 assuming no scheduling.

FIG. 11 plots the mean queue length of the buffer in each bridge assuming there are n=10 bridges and each cable segment produces packets at an input rate $\rho$ between 0.01 and 0.2. When the packets are produced at a rate of only 0.1, the mean queue length grows to infinity.

The following queuing strategy may be used to properly control access to the B channel to prevent the above noted problems. First, assume that packets received in a buffer of a bridge i from the buffer of a preceding bridge i+i−1 and packets generated by the serviced cable segment i will be served at respective rates such that the sum of the two rates equals the rate at which packets can be outputted from the buffer of the bridge i. The service rates cannot simply be ½ for each source of packets at the bridge i, unless i=n. Otherwise, for bridges i<n, too much of the bandwidth will be usurped for packets generated by the cable segment i and little bandwidth will be available for the downstream cable segments.

Instead, a prioritized queuing strategy is employed. At each bridge i, the packet traffic received from the cable segment i at the bridge i via the channel A is referred to as "local traffic" and the packet traffic received from the downstream link via channel B is referred to as "cross traffic." The buffer i at bridge i is configured to have a local traffic or channel A queue and a cross traffic or channel B queue. Let $s_i$ denote the service rate for the $i^{th}$ local traffic queue, where $s_i<1$ for all i. The service rate for the $i^{th}$ cross traffic queue is equal to $r_i-s_i$. Since the $i^{th}$ cross traffic queue might contain packets from downstream cable segments, it is necessary to observe the individual rate of servicing the packets from each downstream cable segment. Thus, at the head end, we observe the equivalent service rate for the local traffic of each cable segment. Let the service rate at the head end be 1. Let $u_i$ be the equivalent service rate for the local traffic of packets produced in the cable segment i. Thus we have:

$$u_1 = s_1$$
$$u_2 = s_2(1-s_1)$$
$$u_3 = s_3(1-s_2)(1-s_1)$$
$$\ldots$$
$$u_n = s_n(1-s_{n-1})\ldots(1-s_2)(1-s_1)$$

To ensure a fair (equal) allocation of the channel B bandwidth amongst each cable segment, we require that $u_i=u$ for all i. Thus, each cable segment gets the same service rate u for the local traffic of packets generated therein. As a result:

$$s_{i+1} = \frac{s_i}{1-s_i}, 1 \le i \le n-1, \forall i$$

and, $$s_i = \frac{1}{n-i+1}, 1 \le i \le n, \forall i$$

Thus, $s_1=n^{-1}$, $s_2=(n-1)^{-1}$, ..., $s_{n-1}=\frac{1}{2}$, $s_n=1$.

As noted above, when the local traffic queue is full, the bridge causes collisions on channel A in the cable segment that it serves. Likewise, when the cross traffic queue is full, the bridge causes collisions on channel B in the downstream link. However, the rate at which the cross traffic queue is serviced is higher for upstream bridges than for downstream bridges, thereby ensuring that the upstream bridges do not usurp an unfair portion of the channel B bandwidth.

The rates $s_i$ and $r_i$ define the equivalent service rates of the local traffic and cross traffic queues in each $i^{th}$ bridge. However, packets from two storage sources must be outputted alternately onto a single channel. A scheduling policy is needed for dictating the ordering by which the local and cross traffic queues are served. A. Parekh & R. Gallager, *A Generalized Processor Sharing Approach to Flow Control in Integrated Services Networks: The Single Node Case*, IEEE/ACM TRANS. ON NETWORKING, vol. 1, no. 3, June 1993, pp. 344–357 proposes a scheduling technique that can be used. However, a simpler approach is provided for the analysis herein using the M/D/1 queuing system. For any buffer with equivalent service rate r<1 receiving traffic packets at the rate of $\rho$, the mean queue length is approximated with a service rate of 1 under input load $\rho/r$. As noted above, the service rate for the local traffic buffer in bridge i is $(n-i+1)^{-1}$. Let $\overline{qa_i}$ denote the corresponding mean queue length and $\overline{wa}_i$ denote the corresponding mean waiting time of the local traffic queue, given by:

$$\overline{qa}_i = \frac{\rho \cdot \beta_i}{1 - \rho \cdot \beta_i} - \frac{(\rho \cdot \beta_i)^2}{2(1 - \rho \cdot \beta_i)}$$

$$\overline{wa}_i = \frac{\rho \cdot \beta_i}{2(1 - \rho \cdot \beta_i)} \cdot t$$

where $\beta_i = n-i+1$ and t represents the mean service time of packets. For example, the service time of a 512 byte packet at a 10 Mbit/sec transmission rate is $(512 \cdot 8)/10^6 = 0.4096$ msec.

In the cable network 100, packets are transmitted on channel B in an upstream direction to the head end. Packets are stored for transmission in the queues of the head end and the i−1 bridges ahead of the bridge i. Thus, an equivalent queue may be defined for each bridge that is attached directly to the head end, with equivalent mean queue length $Q_i$ and an equivalent mean waiting time $W_i$. Let $\overline{qb}_j$ be the mean queue length, and $\overline{wb}_j$ be the mean waiting time, of the cross traffic queue in the $j^{th}$ bridge, where $$\overline{qb}_j = \frac{\rho \cdot \alpha_j}{1 - \rho \cdot \alpha_j} - \frac{(\rho \cdot \alpha_j)^2}{2(1 - \rho \cdot \alpha_j)},$$

$$\text{and } \overline{wb}_j = \frac{\rho \cdot \alpha_j}{2(1 - \rho \cdot \alpha_j)} \text{ where } \alpha_j = \frac{n-j+1}{n-j}$$

$Q_i$ and $W_i$ can then be approximated as $$Q_i = \overline{qa}_i + \sum_{j=1}^{j=i-1} \overline{qb}_j, \text{ and } W_i = \overline{wa}_i + \sum_{j=1}^{j=i-1} \overline{wb}_j$$

Figure 12:
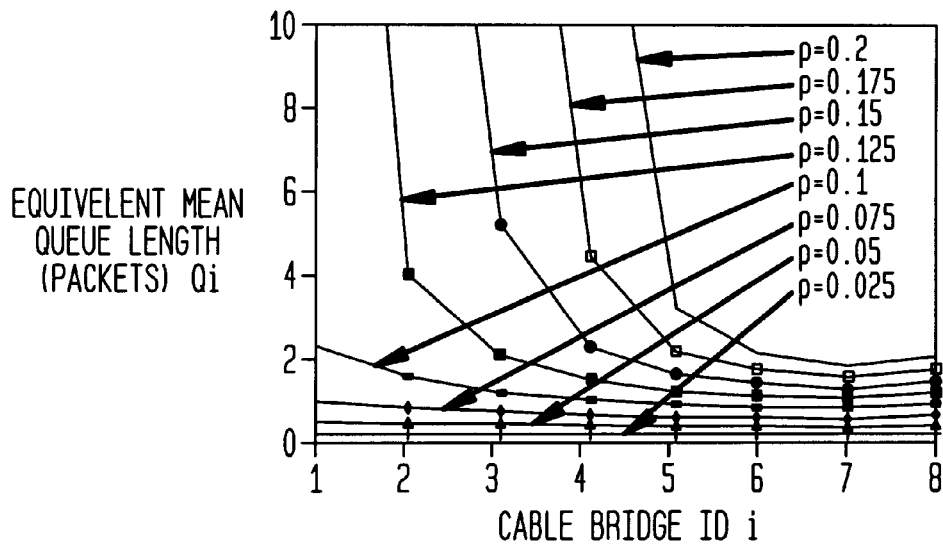
FIG. 12 plots mean queue length in the bridges of FIG. 10 assuming scheduling.
Figure 13:
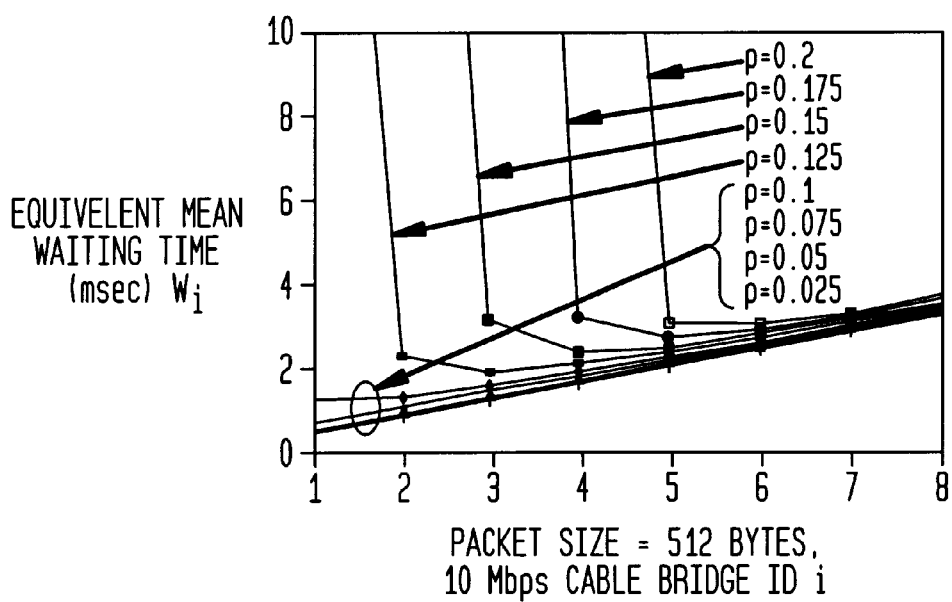
FIG. 13 plots mean waiting time in the queues of the bridges of FIG. 10 assuming scheduling.

FIG. 12 depicts a plot of the equivalent mean queue length assuming scheduling for different packet production rates $\rho=0.025$ to 0.2 for cable segments i=1 to 8. When $\rho=0.1$, the equivalent mean queue length $Q_i$ of each cable bridge i is 3 packets. With 8 cable bridges sharing the upstream channel B, the total bandwidth utilization of the B channel is 80% and each bridge fairly shares the upstream bandwidth. FIG. 13 plots the equivalent mean waiting time $W_i$ under various packet production rates $\rho=0.025$ to 0.2 for cable segments i=1 to 8, assuming a fixed packet size of 512 bytes. Each cable segment has a 10 Mbit/sec bit rate. When $\rho=0.1$, the equivalent mean waiting time $W_i$ of each bridge i is 4 msec.

Conclusion

A cable network architecture is disclosed for achieving wide-band communication for terminal equipments, such as set top boxes. The terminal equipments are divided into plural cable segments such that the maximum segment length (maximum signal path length between any two terminal equipments) is strictly less than a particular maximum length. Each cable segment is served by a bridge. Three carrier frequencies are allocated for defining three channels A, B and C. The channel A is allocated for intra cable segment communication only. The channel B is allocated for upstream directed inter cable segment communication. The channel C is allocated for downstream directed inter cable communication. The architecture according to the present invention maximizes the bit rate at which communications can occur.

The above discussion is intended to be merely illustrative of the invention. Those having ordinary skill in the art may devise numerous alternative embodiments without departing from the spirit and scope of the following claims.

The claimed invention is:

1. A method for communicating in a cable network comprising the steps of:

at a bridge that is connected to a first cable segment:

(a) receiving from a shared communication medium a first carrier signal, having a first carrier frequency that is allocated for intra cable segment packet communication, containing packets modulated thereon, (b) demodulating selected packets originating in said first cable segment from said first carrier signal, (c) modulating each of said demodulated packets, that are destined outside of said first cable segment, onto a second carrier signal having a second carrier frequency that is allocated for upstream directed inter cable segment communication, (d) transmitting said second carrier signal on an upstream link of said common shared medium, (e) receiving at said bridge from a downstream link of said shared communication medium, to which at least a second cable segment is connected, a third carrier signal, having said second carrier frequency, (f) demodulating packets from said third carrier signal, and (g) modulating each of said packets that were demodulated from said third carrier signal onto said second carrier signal.

2. The method of claim 1 further comprising the steps of:

(h) receiving at said bridge, from said upstream link, a fourth carrier signal, having a third carrier frequency that is allocated for downstream inter cable segment communication, (i) demodulating selected packets from said fourth carrier signal, and (j) when said first signal is idle, modulating at least one of said packets demodulated from said fourth carrier signal onto a fifth carrier signal, having said first carrier frequency, and transmitting said fifth carrier signal from said bridge in said first cable segment.

3. The method of claim 2 further comprising the steps of:

at a head end:

(k) receiving said second carrier signal from said shared medium, (l) demodulating each packet from said second carrier signal, (m) modulating each of said demodulated packets, that is destined to a cable segment connected downstream of said cable head end, onto said fourth carrier signal, and (n) transmitting said fourth carrier signal from said cable head end on said shared medium.

4. The method of claim 1 further comprising the steps of:

(h) enqueuing each of said packets demodulated from said first carrier signal into a first queue, (i) enqueuing each of said packets demodulated from said second carrier signal into a second queue, and (j) in performing said steps (c) and (g), selectively dequeuing packets from said first or second queues for modulation onto said second carrier signal.

5. The method of claim 4 wherein said step (j) further comprises the steps of:

(k) determining a service ratio of said first and second queues according to which said first and second queues are selected for dequeuing packets, based on the number of additional bridges connected to said downstream link of said shared medium.

6. The method of claim 5 wherein an equivalent service rate of said first queue equals $(n-i+1)^{-1}$ where i−1 total cable segments are connected to said shared medium upstream of said bridge, where n−i total cable segments are connected to said shared medium downstream of said bridge, and where n total cable segments are connected to said shared medium.

7. The method of claim 4 further comprising the steps of:
 (k) selectively reducing a rate of packet receipt at said bridge by said bridge causing a collision on at least one of said downstream link and said cable segment.

8. The method of claim 1 further comprising the steps of, at each of plural terminal equipments in said first cable segment containing a to-be-transmitted packet:
 (e) sensing that no carrier signal, having said first carrier frequency, is present on said shared medium,
 (f) modulating said to-be-transmitted packet onto a certain carrier signal having said first carrier frequency, and
 (g) transmitting said certain carrier signal on said shared medium.

9. The method of claim 8 further comprising the steps of, at each of said terminal equipments:
 (h) during said step (g), determining that a collision has occurred if said terminal equipment detects another transmission of another carrier signal having said first carrier frequency, and
 (i) in response to said collision, determining that said to-be-transmitted packet was not successfully transmitted, waiting for a period of time and re-performing said steps (e)–(g).

10. The method of claim 1 further comprising the steps of, at said bridge:
 (e) performing steps (c) and (d) only in response to sensing that no carrier signal having said second carrier frequency is present on said upstream link.

11. The method of claim 10 further comprising the steps of, at said bridge:
 (f) during said step (d), determining that a collision has occurred if said bridge detects another carrier signal having said second carrier frequency on said upstream link, and
 (i) in response to said collision, determining that said packet transmitted in steps (d) and (e) was not successfully transmitted, waiting for a period of time and re-performing said steps (c)–(e).

12. A method for communicating in a cable network comprising the steps of:
 (a) receiving a first carrier signal, having a first carrier frequency allocated for upstream directed intra cable segment communication from a shared medium,
 (b) demodulating from said first carrier signal, a packet that originated in a first cable segment connected to said shared medium and is destined to a second cable segment connected to said shared medium,
 (c) modulating said demodulated packet onto a second carrier signal, having a second carrier frequency that is allocated for downstream directed inter cable segment communication,
 (d) transmitting said second carrier signal on said shared medium,
 (e) receiving at said bridge from a downstream link of said shared communication medium, to which at least a second cable segment is connected, a third carrier signal, having said second carrier frequency,
 (f) demodulating packets from said third carrier signal, and
 (g) modulating each of said packets that were demodulated from said third carrier signal onto said second carrier signal.

13. A method for communicating on a cable network comprising:
 (a) organizing each terminal equipment connected to a head end via a shared medium into plural cable segments,
 (b) allocating a first carrier frequency for only intra cable segment communication, a second carrier frequency for only upstream directed inter cable segment communication and a third carrier frequency for only downstream directed communication,
 (c) transmitting and receiving packets at each terminal equipment that are modulated only on a carrier signal having said first carrier frequency, and
 (d) at each bridge connected to one of said cable segments, transmitting packets that are destined outside of said connected cable segment, by modulating said packets on a carrier signal of only said second carrier frequency, and receiving packets that are destined to said connected cable segment, but originating outside of said connected cable segment, that are modulated on a carrier signal of only said first carrier frequency.

14. A bridge in a cable network comprising:
 a first connection to a first cable segment, for receiving at least a first carrier signal, having a first carrier frequency that is allocated for intra cable segment packet communication, containing packets modulated thereon,
 a first demodulator for demodulating selected packets originating in said first cable segment from said first carrier signal,
 a first modulator for modulating only those of said selected packets, that are destined outside of said first cable segment, onto a second carrier signal having a second carrier frequency allocated for upstream inter cable segment packet communication, and
 a second connection to an upstream shared communication medium link of said cable network for transmitting said second carrier signal
 wherein said input also receives, from a downstream shared communication medium link, to which at least a second cable segment is connected, a third carrier signal, having said second carrier frequency,
 said bridge further comprising a second demodulator for demodulating packets from said third carrier signal, and
 wherein said first modulator modulates each of said packets that were demodulated from said third carrier signal onto said second carrier signal.

15. The bridge of claim 14:
 wherein said second connection receives a fourth carrier signal, having a third carrier frequency that is allocated for downstream inter cable segment communication,
 said bridge further comprising a third demodulator for demodulating packets destined to said first cable segment from said fourth carrier signal, and
 a second modulator for, when said first carrier signal is idle, modulating said packets that were demodulated from said fourth carrier signal onto a fifth carrier signal, having said first carrier frequency, and
 wherein said first connection transmits said fifth carrier signal to said first cable segment.

16. The bridge of claim 14 further comprising:

a buffer with a first queue for enqueuing selected ones of said packets that were demodulated by said first demodulator and a second queue for enqueuing each of said packets that were demodulated by said second demodulator, said buffer selectively outputting packets from said first queue or said second queue to said first modulator.

17. The bridge of claim 16 further comprising:

a first filter connected between said buffer and said first demodulator for selecting only those packets that were demodulated by said first demodulator and are also destined outside of said first cable segment.

18. A cable network comprising:

a shared medium, a plurality of terminal equipments connected to said shared medium and organized into plural cable segments, a first carrier frequency, in a frequency band of said shared medium, allocated for only intra cable segment communication, a second carrier frequency, in said frequency band of said shared medium, allocated for only upstream directed inter cable segment communication, a third carrier frequency, in said frequency band of said shared medium, allocated for only downstream directed inter cable segment communication, and at least one bridge connected to at least one of said cable segments, wherein each of said terminal equipments transmits and receives packets that are modulated only on carrier signals having said first carrier frequency, and wherein said at least one bridge receives packets from terminal equipments in said connected at least one cable segment that are modulated only on said carrier signals having said first frequency, transmits those of said received packets, that are destined outside of said connected at least one cable segment, by modulating said received packets on a second carrier signal having said second carrier frequency, receives second packets that are destined to said at least one connected cable segment, by demodulating said second packets from a third carrier signal having said third carrier frequency, and transmits said second packets by modulating said second packets on a fourth carrier signal having said first carrier frequency.

* * * * *